US009791095B2

(12) United States Patent
Chen et al.

(10) Patent No.: US 9,791,095 B2
(45) Date of Patent: Oct. 17, 2017

(54) SUPPORTING STAND FOR DISPLAY DEVICE (71) Applicant: SYNCMOLD ENTERPRISE CORP., New Taipei (TW)

(72) Inventors: Kuang-Po Chen, New Taipei (TW); Kun-Tien Ting, New Taipei (TW); Wen-Chen Liu, New Taipei (TW); Li-Wei Shih, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 15/238,502

(22) Filed: Aug. 16, 2016

(65) Prior Publication Data
US 2017/0051866 A1    Feb. 23, 2017

(30) Foreign Application Priority Data
Aug. 21, 2015   (TW) .............................. 104213501 U (51) Int. Cl.
| *H05K 7/02* | (2006.01) |
| *F16M 11/04* | (2006.01) |
| *F16M 11/20* | (2006.01) |
| *F16M 11/10* | (2006.01) |

(52) U.S. Cl.
CPC .......... *F16M 11/046* (2013.01); *F16M 11/10* (2013.01); *F16M 11/2014* (2013.01)

(58) Field of Classification Search
CPC .. F16M 11/046; F16M 11/10; F16M 11/2014; A47B 97/00; A47B 2097/003; A47B 2097/005; H05K 5/0234; H05K 5/0247; H05K 5/0017
See application file for complete search history.

(56) References Cited

U.S. PATENT DOCUMENTS

| 5,850,997 | A  | * | 12/1998 | Rosen   | B64D 11/0015 248/222.11 |
| 5,978,211 | A  |   | 11/1999 | Hong    |                        |
| 6,179,263 | B1 | * | 1/2001  | Rosen   | B60R 11/0235 248/278.1  |
| 6,268,997 | B1 | * | 7/2001  | Hong    | F16M 11/10 248/398      |
| 6,409,134 | B1 | * | 6/2002  | Oddsen, Jr. | F16M 11/10 248/274.1 |
| 6,609,691 | B2 | * | 8/2003  | Oddsen, Jr. | F16M 11/10 248/278.1 |

(Continued)

*Primary Examiner* — James Wu
*Assistant Examiner* — Hung Dang
(74) *Attorney, Agent, or Firm* — Muncy, Geissler, Olds & Lowe, P.C.

(57) ABSTRACT

Disclosed is a supporting stand for a display device, which includes: a base; a frame body connected to the base for holding the display device and rotatable with respect to the base; an electrical function unit disposed within the base; and an electrical connection unit extending through the interior of the frame body to provide an electrical connection between the display device and the electrical function unit. The electrical connection unit includes a main cable that has a reserve section with a cable length larger than the corresponding minimal pathway distance. Accordingly, when the frame body rotates, the main cable can adjust itself to the rotation of the frame body by cable twisting at the reserve section.

10 Claims, 8 Drawing Sheets (56) References Cited

U.S. PATENT DOCUMENTS

| | | | |
|---|---|---|---|
| 6,712,321 B1 * | 3/2004 | Su | F16M 11/105 |
| | | | 248/123.11 |
| 7,209,344 B2 * | 4/2007 | Hillman | F16M 11/08 |
| | | | 248/917 |
| 7,389,965 B2 * | 6/2008 | Oddsen, Jr. | F16M 11/10 |
| | | | 248/274.1 |

* cited by examiner

SUPPORTING STAND FOR DISPLAY DEVICE

CROSS REFERENCE TO RELATED APPLICATION

This application claims the benefits of the Taiwan Patent Application Serial Number 104213501, filed on Aug. 21, 2015, the subject matter of which is incorporated herein by reference.

BACKGROUND OF THE INVENTION

1. Field of the Invention

The present invention relates to a supporting stand and, more particularly to, a supporting stand with an electrical connection unit incorporated in an interior of a frame body.

2. Description of Related Art

Disclosed in U.S. Pat. No. 5,978,211 is a stand that includes an interface circuit board and a speaker installed at its base. By virtue of a cable disposed in the interior of the stand, the interface circuit board can be electrically connected to a main circuit board which is in a display device. For rotation function, the disclosed stand is provided with a hinge assembly that includes a hinge body and a vertical hinge shaft at its upper portion. Accordingly, the display device can rotate with respect to the vertical hinge shaft by means of the hinge body. In the meanwhile, as the cable is disposed to pass through the vertical hinge shaft that is fixed to the stand body, the rotation of the hinge body would not result in twisting of the cable.

Although the disclosed stand can prevent the operation of the stand from the cable interfering by the stationary vertical hinge shaft, the hinge assembly is configured mainly for height non-adjustable stands. Therefore, for other types of stands having different configurations or capabilities, different cable arrangements are required to ensure product reliability and smooth operation.

For the reasons stated above, an urgent need exists to develop a new cable arrangement adapted to various stand operation manners.

SUMMARY OF THE INVENTION

An objective of the present invention is to provide a supporting stand for a display device, which is characterized in that an electrical connection unit built in the interior of the supporting stand is routed in a specific manner to be adapted to the motion of the supporting stand so as to avoid breaking of the electrical connection unit caused by motion of the supporting stand, thereby ensuring product reliability and smooth operation.

In accordance with the foregoing objectives, the present invention provides a supporting stand for a display device, including a base, a frame body, an electrical function unit and an electrical connection unit. The frame body is connected to the base and used for mounting the display device and rotatable with respect to the base. The electrical function unit is disposed within the base, and the electrical connection unit extends through the interior of the frame body and provides electrical connection between the display device and the electrical function unit. In the present invention, the electrical connection unit includes a main cable that is electrically connected to the electrical function unit and has a reserve section longitudinally extending to the base. Further, the reserve section has a larger cable length than its corresponding minimum pathway distance.

Accordingly, the reserve section of the main cable is in a relaxed state when the frame body is not pivoted to a pivot angle and allows twisting adapted to pivot motion of the frame body. As a result, breaking of the electrical connection unit caused by rotation of the frame body can be avoided.

More specifically, the supporting stand can further include a first organizer and a second organizer, and the reserve section of the main cable longitudinally extends through the first organizer and the second organizer in sequence in the direction toward the base. By the second organizer, the main cable is formed with a bent portion at the base and further laterally extends toward the electrical function unit. In rotation of the frame body, the first organizer can rotate synchronously with the frame body, whereas the second organizer keeps stationary. As a result, the pivot motion of the frame body would induce twisting in the reserve section of the main cable.

In the present invention, the frame body of the supporting stand can be interlocked with or detachably associated with the display device. For instance, in a preferred embodiment of the present invention, the frame body includes an upright and a holding unit, wherein the upright is connected to the base, and the holding unit is connected to the upright and used for detachably mounting the display device.

In the present invention, the electrical connection unit can be electrically connected to the display device in any manner without particular limitation, as long as the display device can be electrically connected to the electrical function unit through the electrical connection unit to form an electrical loop. For instance, the electrical connection unit can have a first cable and a second cable, wherein one end of the first/second cable is connected to the main cable and the other end is connected to anode/cathode contact of the display device. Alternatively, as illustrated in one preferred embodiment of the present invention, the holding unit can be provided with an anode conductive portion and a cathode conductive portion for electrical contact with an anode contact and a cathode contact of the display device, respectively. In this aspect, the first and second cables are electrically connected to the anode and cathode conductive portions of the holding unit, respectively. As a result, the display device mounted on the holding unit can be electrically connected to the first and second cables through the anode and cathode conductive portions of the holding unit. For the main cable, the first cable and the second cable, the selection of cable types can be made according to the requirement without particular restriction. In consideration of easy routing of the main cable received within the upright, the main cable preferably is a flexible cable.

In the present invention, based on the practical requirement for function, the electrical function unit may include, but is not limited to, a light emitting module, an input/output module, a control module, an audio module or/and other multimedia function modules. Accordingly, the supporting stand not only provides mechanical support for the display device, but also may be provided with more diversified functions at the base according to user's demand.

In the present invention, the holding unit can be configured as adjustable or non-adjustable in height according to requirement. Preferably, the holding unit is adjustable in height and can slide upward and downward in a channel formed in the upright. Accordingly, the display device can be adjusted to desired height for comfortable viewing. Further, in order to avoid breaking of the electrical connection unit caused by lifting and lowering motion of the holding unit, the main cable preferably has a free section corresponding to the channel. The free section of the main cable can be forced into bending and thus be adapted to the sliding motion of the holding unit.

The foregoing and other objects, advantages, and novel features of the invention will become more apparent from the following detailed description when taken in conjunction with the accompanying drawings.

DETAILED DESCRIPTION OF THE PREFERRED EMBODIMENT

Hereafter, example will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
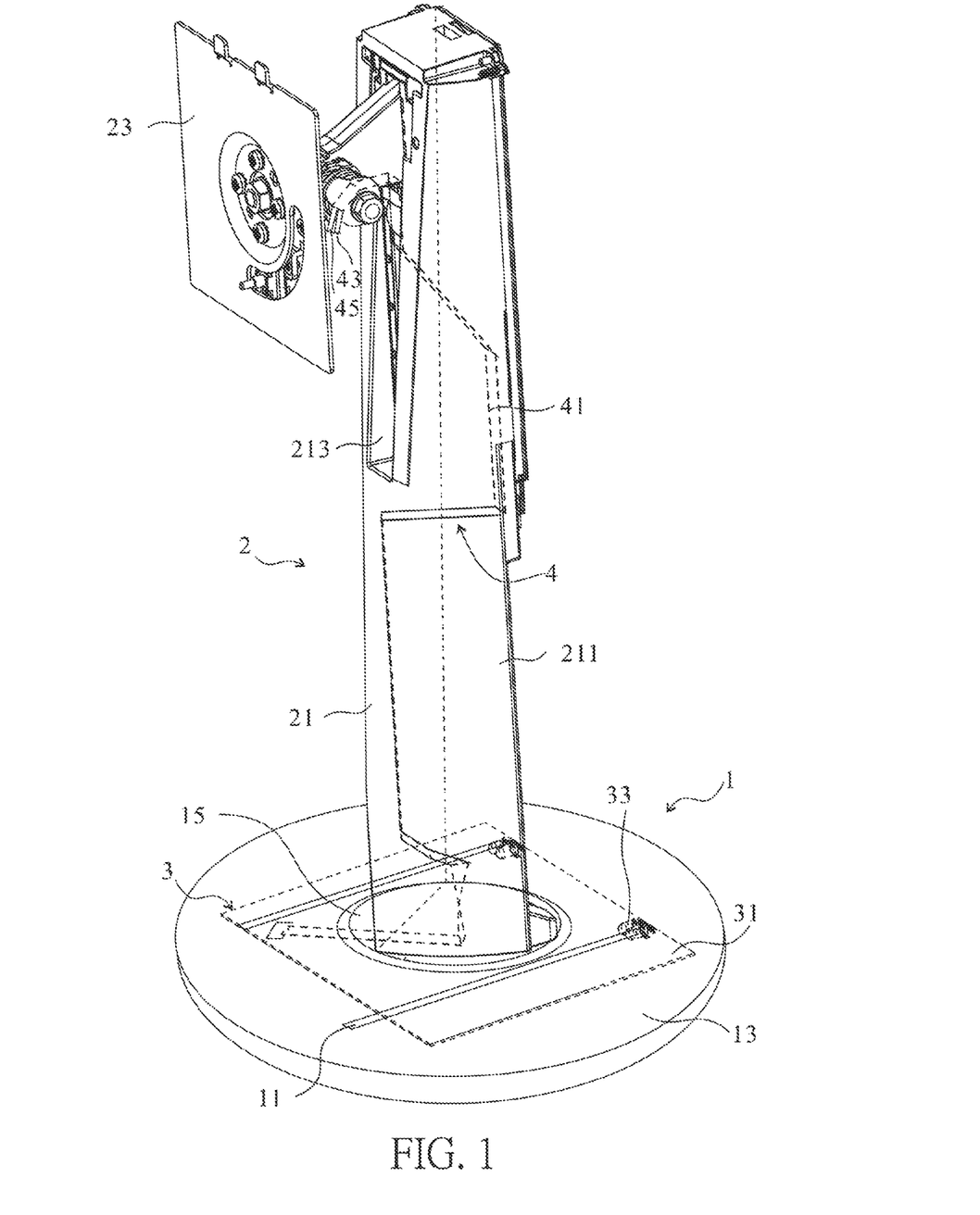
FIG. 1 is a perspective schematic view of a supporting stand in accordance with one embodiment of the present invention.

Please refer to FIG. 1, which is a perspective schematic view of a supporting stand 1000 in accordance with one embodiment of the present invention. The supporting stand 1000 of this embodiment includes a base 1, a frame body 2, an electrical function unit 3 and an electrical connection unit 4. In this illustration, the frame body 2 is associated with the base 1 and rotatable with respect to the base 1; the electrical function unit 3 is disposed within the base 1; and the electrical connection unit 4 is electrically connected to the electrical function unit 3, extending along and passing through the interior of the frame body 2. In this embodiment, a detachable supporting stand is illustrated for exemplary description. That is, the frame body 2 includes an upright 21 and a holding unit 23. In this illustration, the upright 21 is connected to the base 1 and the holding unit 23 is connected to the upright 21 and used for detachably mounting the display device. Accordingly, the supporting stand 1000 of the present invention can be placed on a working face (such as desk, not shown in the figure), and a display device (not shown in the figure) can be mounted on the holding unit 23 of the frame body 2 and electrically connected to the electrical function unit 3 through the electrical connection unit 4.

For exemplary purposes, the electrical function unit 3 is illustrated to include a circuit board 31 and a light emitting module 33. When the display device (not shown in the figure) is mounted on the holding unit 23, the display device is electrically connected to the electrical function unit 3 at the base 1 and can provide electric power to the circuit board 31 at the base 1 and further transmits the electric power to the light emitting module 33 which is electrically coupled to the circuit board 31. Accordingly, upon the display device being powered on, light can be emitted by the light emitting module 33 and pass outward from the interior of the base 1 through a window 11 of the base 1. For the supporting stand 1000 of the present invention, the electrical function unit 3 at the base 1 is not limited to the above-illustrated aspect, and may be configured to offer other function or multiple functions according to practical requirement. For instance, in addition to the above-mentioned light emitting module, the electrical function unit 3 may further include, but not limited to, an input/output module, a control module, an audio module or other multimedia modules. Additionally, the electrical connection unit 4 is not limited to the function of electric power transmission, and it also can be used for signal transmission. On the other hand, the power or signal also can be supplied from the electrical function unit 3 to the display device, reversely. The present invention is characterized in that the electrical connection unit 4 is integrated in the interior of the frame body 2, and adapted to the motion of the supporting stand 1000 by means of a specific cable arrangement so as to avoid the electrical connection unit 4 being damaged by motion of the supporting stand 1000. It should be noted that the cable arrangement of the present invention is not limited to being applied to the detachable supporting stand shown in the figures. For instance, it also can be applied to a supporting stand that is non-detachably interlocked with a display device.

With regard to the arrangement of the electrical connection unit 4, as shown in FIG. 1, the electrical connection unit 4 is illustrated to comprise a main cable 41, a first cable 43 and a second cable 45 for exemplary description.

In the present invention, the main cable 41 is disposed in the interior of the upright 21 of the frame body 2 to avoid exposed cables that may cause generating interference or destroy a cohesive feel of the supporting stand. Further, in consideration of the easy routing of the main cable 41 within the upright 21, a flexible flat cable is used as the main cable 41 in this embodiment. As shown in FIG. 1, the interior of the upright 21 is formed with a receiving trough 211 that can accommodate the main cable 41 and define the shortest pathway for routing cable between the first and second cables 43, 45 and the base 1. The main cable 41 in the receiving trough 211 can be arranged to have a number of bent portions by means of an adhesive and retaining rings (not shown in figures), that is to say, the main cable 41 is longer than the shortest pathway.

Figure 2:
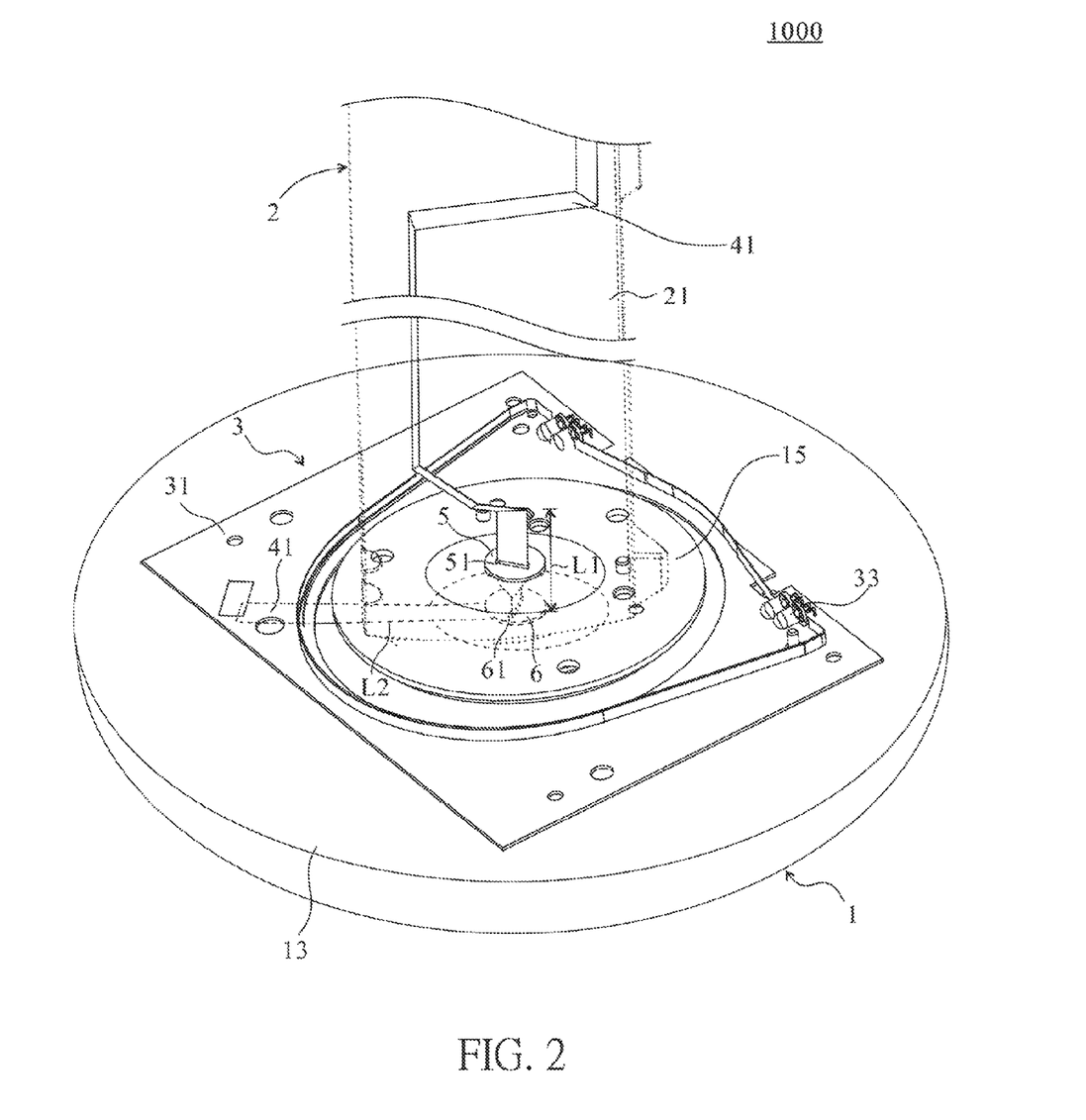
FIG. 2 is a partial exploded schematic view of the lower part of the supporting stand in accordance with one embodiment of the present invention.

FIG. 2 is provided to further illustrate the lower part of the supporting stand 1000 with regard to the detail structure of components and the arrangement of the electrical connection unit. As shown in FIG. 2, which is perspective schematic view of the lower part of the supporting stand 1000, the base 1 has a fixing baseplate 13 and a rotary plate 15 which is disposed on the fixing baseplate 13. The rotary plate 15 is associated with the bottom of the upright 21 of the frame body 2 and rotatable with respect to the fixing baseplate 13, so that the display device can be oriented to face any direction by pivot motion of the upright 21. In this illustration, the lower section of the main cable 41 extends along the upright 21 and is formed with a bent portion at the base 1 and further laterally extends from the bent portion to an electrical joint site of the electrical function unit 3. More specifically, the main cable 41 can be routed in any suitable manner according to the configuration of the lower part of the upright 21, and has a reserve section L1 longitudinally extending to the base 1. Accordingly, the main cable 41 permits twisting in the reserve section L1 to conform to the pivot motion of the frame body 2. In detail, since the cable length of the reserve section L1 is larger than its corresponding longitudinal pathway distance extending to the base 1, the breaking of cable caused by excessive tightening force in pivot motion of the upright 2 can be avoided.

Additionally, the supporting stand 1000 of this embodiment further includes a first organizer 5 and a second organizer 6 near the junction between the frame body 2 and the base 1 to reduce the friction or interference between the main cable 41 and other components. The first organizer 5 is disposed at the rotary plate 15, whereas the second organizer 6 is disposed at the fixing baseplate 13. The reserve section L1 of the main cable 41 longitudinally extends toward the base 1 and passes through the first organizer 5 and the second organizer 6 in sequence. By the second organizer 6, the main cable 41 is formed with a bent portion at the base 1, and further has a lateral extension section L2 that laterally extends from the bent portion and is electrically connected to the electrical function unit 3. In this embodiment, the first organizer 5 and the second organizer 6 are disc-shaped and have through openings 51, 61 at their center to permit passage of the main cable 41, but are not limited thereto.

Before the frame body 2 is pivoted to a pivot angle, the reserve section L1 of the main cable 41 within the frame body 2 is in a relaxed state and not tensioned because the cable length of the reserve section L2 is larger than its corresponding minimum pathway distance (for figure simplicity, the reserve section L1 being not illustrated in the relaxed state). When the frame body 2 is rotated with respect to the base 1, the second organizer 6 is maintained stationary, and the first organizer 5 would rotate synchronously with the frame body 2 and the rotary plate 15; therefore, the cable is twisted in the reserve section L1. In order to avoid breaking of the main cable 41 resulting from excessive tightening force in rotation of the frame body 2, the cable length of the reserve section L1 of the main cable 41 is preferably determined depending on the angle that the frame body 2 can be rotated.

Figure 3:
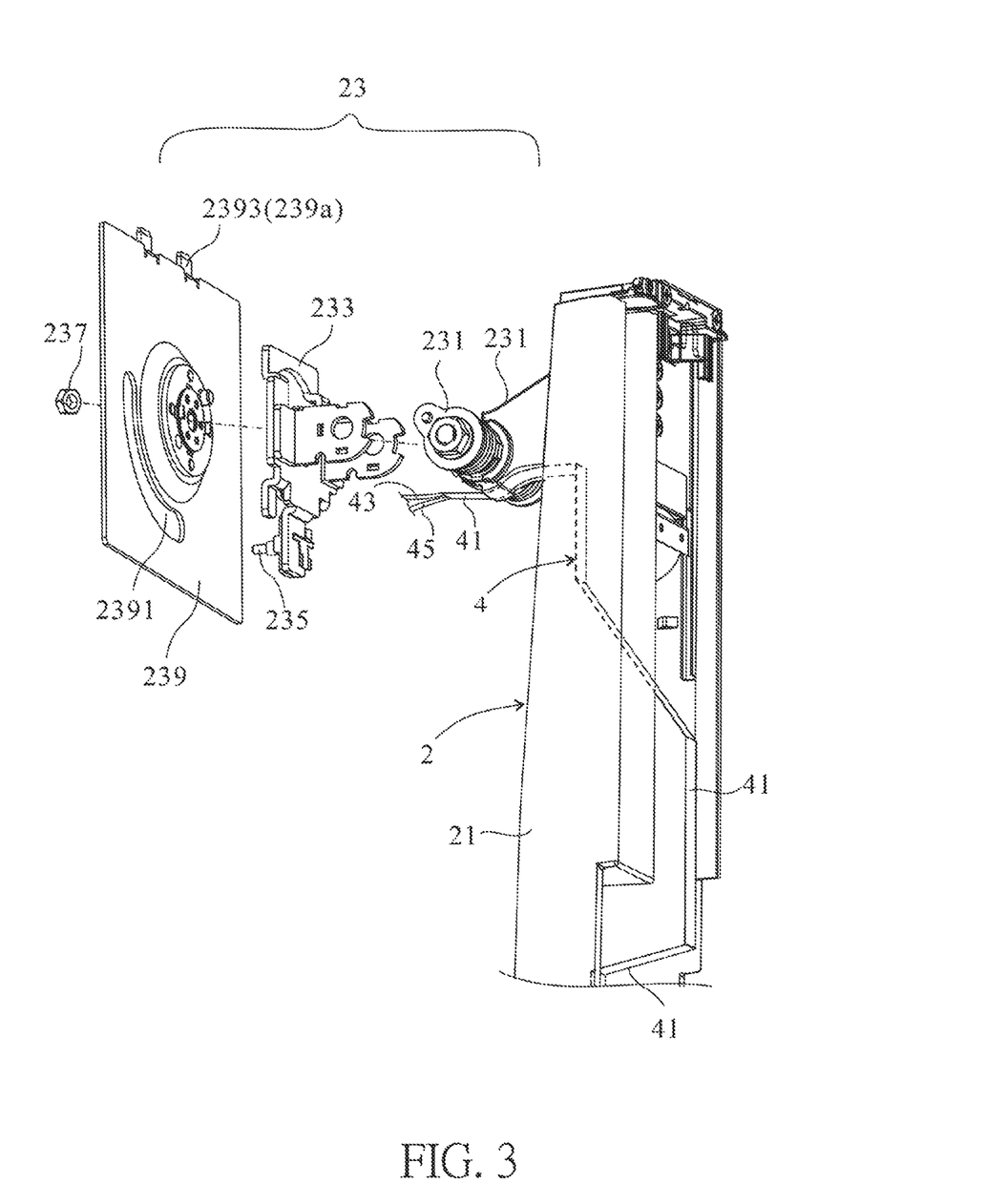
FIG. 3 is a partial exploded schematic view of the upper part of the supporting stand at one angular orientation in accordance with one embodiment of the present invention.
Figure 4:
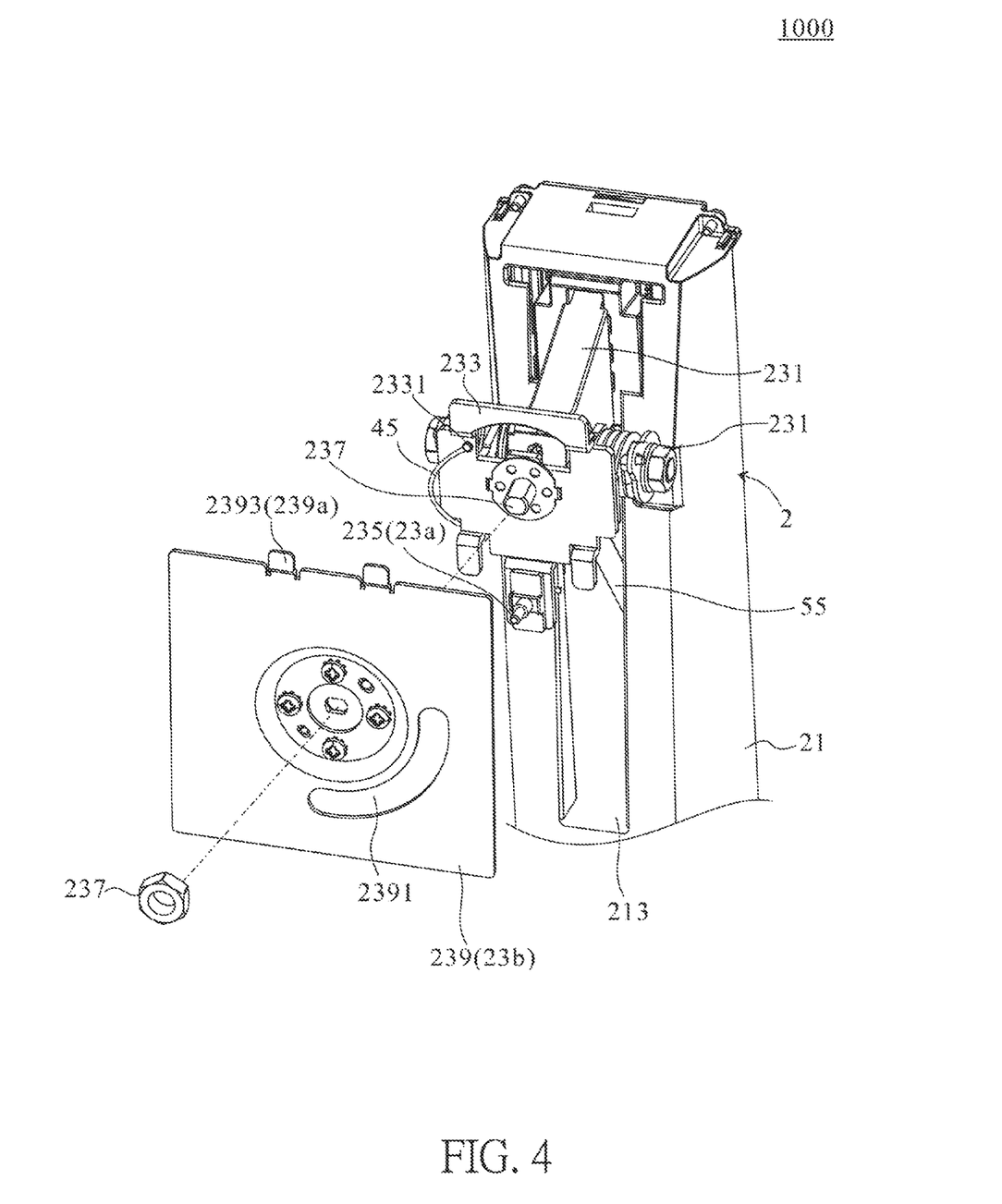
FIG. 4 is a partial exploded schematic view of the upper part of the supporting stand at another angular orientation in accordance with one embodiment of the present invention.
Figure 5:
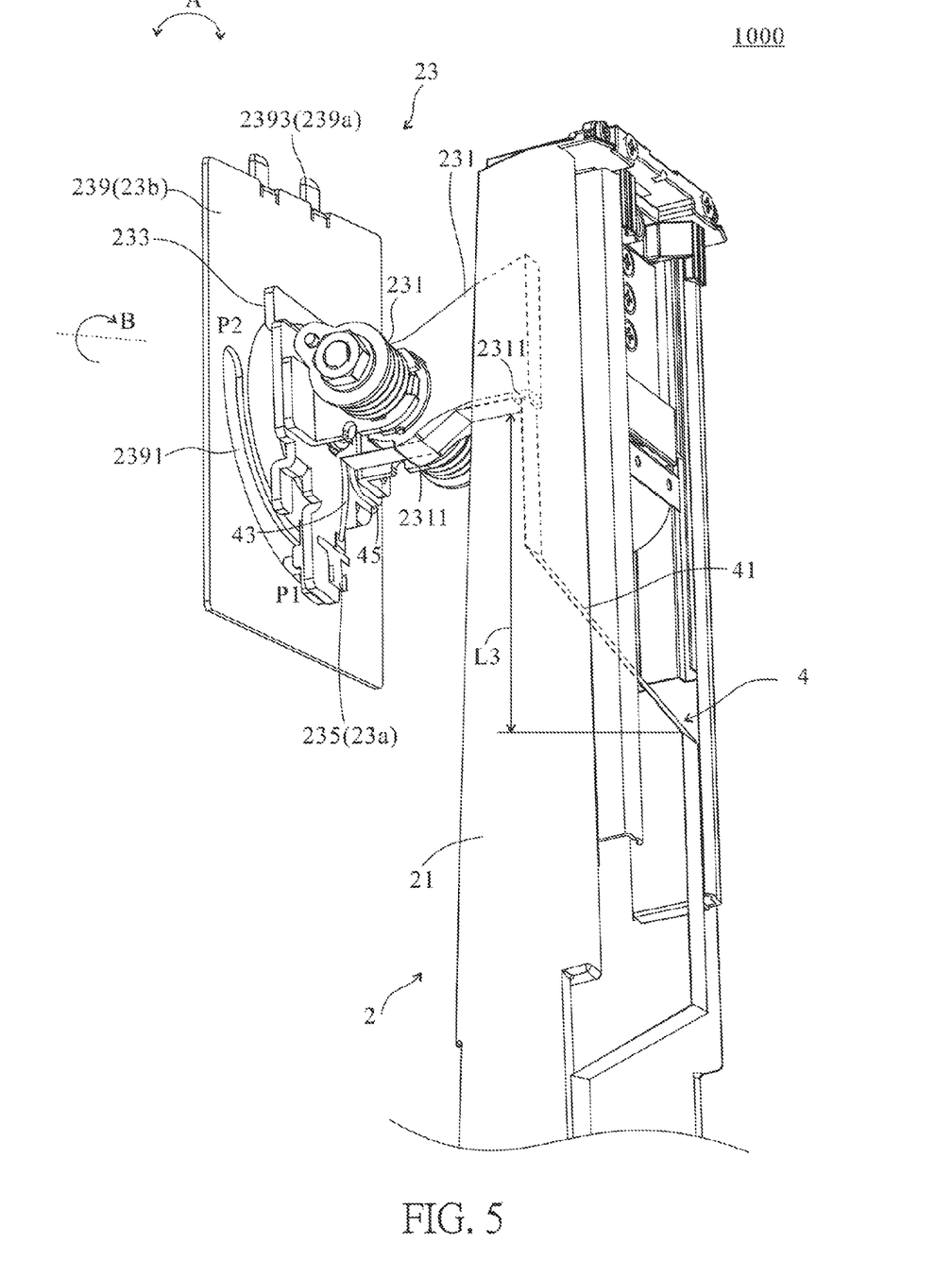
FIG. 5 is a perspective schematic view of the upper part of the supporting stand in accordance with one embodiment of the present invention.
Figure 6:
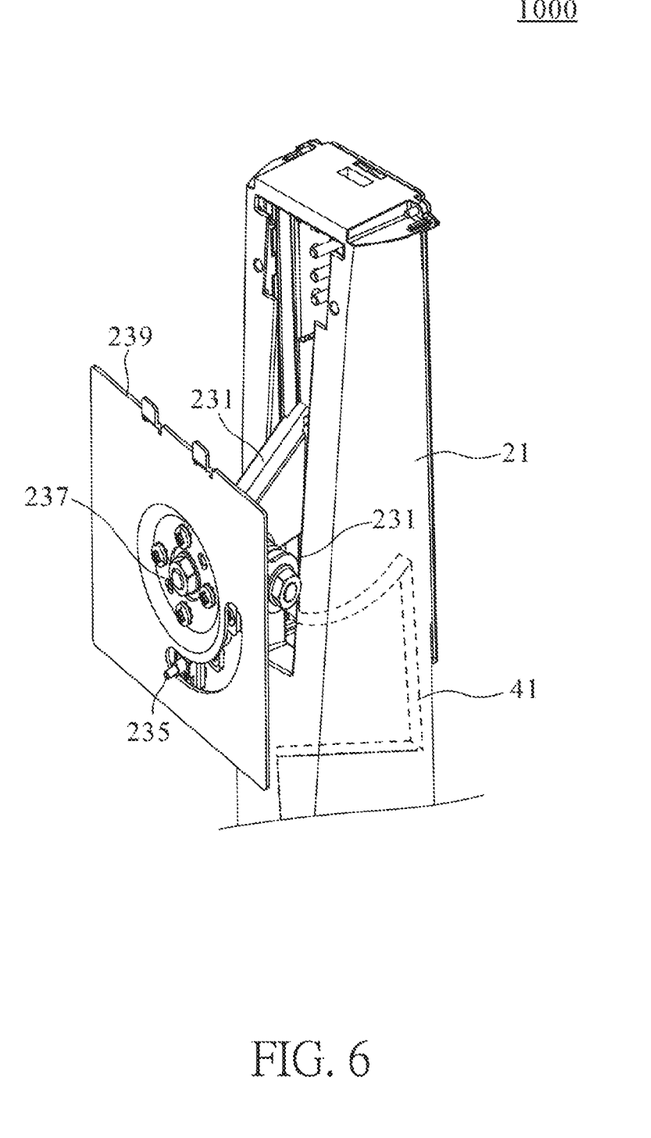
FIG. 6 is a perspective schematic view of a supporting stand in which the holding unit is shifted to the lowest position in accordance with one embodiment of the present invention.

Please further refer to FIGS. 3-5, which are provided for detailed illustration of the upper part of the supporting stand 1000 with regard to the detail structure of components and the arrangement of the electrical connection unit. The holding unit 23 of the present invention can be adjustable or non-adjustable according to practical requirement. In this embodiment, the holding unit 23 is illustrated as being able to pivot and height adjustable for exemplary description. As shown in FIGS. 3 and 4, which are partial exploded schematic views of the upper part of the supporting stand 1000 at different angular orientations, the holding unit 23 has a sliding assembly 231, a fixing plate 233, a pin connector 235, a shaft assembly 237 and a main plate 239. In this illustration, the sliding assembly 231 has one end slidably disposed at a channel 213 of the upright 21 (please referring to FIG. 4) and another end pivotally attached to the fixing plate 233. The shaft assembly 237 and the pin connector 235 are fastened on the fixing plate 233, and the main plate 239 is pivotably connected to the shaft assembly 237. Accordingly, as shown in FIG. 5, which is a perspective schematic view after assembling, the display device can be adjusted to a desired height by means of the sliding assembly 231, and also can be oriented to desired viewing angle by adjusting the forward/back tilt angle of the main plate 233 (as shown in arrow A). Further, the display device can be placed in landscape or portrait orientation by rotary motion of the main plate 239 in respect of the shaft assembly 237 (as shown in arrow B). Following the above-illustrated arrangement of the main cable 41 in the lower part of the frame body 2, the upper section of the main cable 41 extends to the holding unit 23 along the upper part of the frame body 2. In this illustration, the bottom of the sliding assembly 231 is provided with two retaining rings 2311 to permit passage of the main cable 41. By the retaining rings 2311 and an adhesive, the main cable 41 can be firmly fastened to the lower face of the sliding assembly 231. Further, the main cable 41 has a free section L3 corresponding to the channel 213 of the upright 21 in order to permit the sliding assembly 231 to slide upward and downward along the channel 213 at the front side of the upright 21. Both opposite ends of the free section L3 are respectively attached to the sliding assembly 231 at the front side of the upright 21 and fastened adjacent the rear side of the upright 21. The middle portion of the free section L3 between the opposite ends can be forced into bending and thus adapted to the sliding motion of the sliding assembly 231. Accordingly, when the sliding assembly 231 at the position as shown in FIG. 5 is shifted to lower position as shown in FIG. 6, the end of the free section L3 which is fastened adjacent the rear side of the upright 21 is maintained stationary, and another end would move upward and downward with the sliding assembly 231 to conform to the motion of the sliding assembly 231.

Attention is now directed back to FIGS. 4 and 5 for detailed illustration of the electrically connected arrangement of the first cable 43 and the second cable 45. For the quick-release capability of the supporting stand, the first and second cables 43, 45 are illustrated to be connected to the holding unit 23 separately. However, it should be noted that the first and second cables 43, 45 are not limited to the arrangement mentioned below. For instance, it is also feasible for the present invention to directly couple the first cable 43 and the second cable 45 to the anode contact and the cathode contact of the display device separately.

As shown in FIGS. 4 and 5, the first cable 43 has one end electrically connected to the main cable 41 and an opposite end electrically connected to the pin connector 235. Likewise, the second cable 45 has one end electrically connected to the main cable 41 and an opposite end electrically connected to an electrical joint structure 2331 (shown in FIG. 4) at the front side of the fixing plate 233. The electrical joint structure 2331 of the fixing plate 233 is disposed in direct electrical contact with the rear side of the main plate 239. In this illustration, the main plate 239 is formed with an open slot 2391 and two protrusions 2393, and the pin connector 235 fastened on the fixing plate 233 is electrically isolated from the main plate 239 and extends through the open slot 2391 from the rear side of the main plate 239. The pin connector 235 can serve as an anode conductive portion 23a and be brought into direct electrical contact with an anode contact of the display device mounted on the front side of the main plate 239. The main plate 239 can serve as a cathode conductive portion 23b and the protrusion 2393 is used as contact region 239 for electrical contact with a cathode contact of the display device. As a result, the display device can be electrically connected to the electrical connection unit 4 through the pin connector 235 and the main plate 239. In the rotary motion of the main plate 239, the display device mounted on the main plate 239 can rotate with the main plate 239 in respect of the shaft assembly 237, and the pin connector 235 fastened on the fixing plate 233 would keep stationary. As the rotary motion of the main plate 239 would cause the change in the relative position of the pin connector 235 at the open slot 2391, the open slot 2391 of the main plate 239 is preferably shaped according to the relative motion trajectory between the pin connector 235 and the main plate 239 induced by rotation of the main plate 239. As such, the pin connector 235 does not interfere with the rotary motion of the main plate 239. In this exemplary aspect of the main plate 239 being configured to permit rotation of 90 degrees, the open slot 2391 can be formed into an arc, as shown in FIG. 5, adapted to the rotation of the main plate 239 from 0°-orientation to 90°-orientation. More specifically, the arc-shaped open slot 2391 is formed around a center point located on the axis (shown in dashed line of FIG. 4) of the shaft assembly 237, and the relative position of the pin connector 235 at the open slot 2391 would change from the "P1" location to the "P2" location of the open slot 2391 while the main plate 239 is rotated from 0°- to 90°-orientation.

Figure 7:
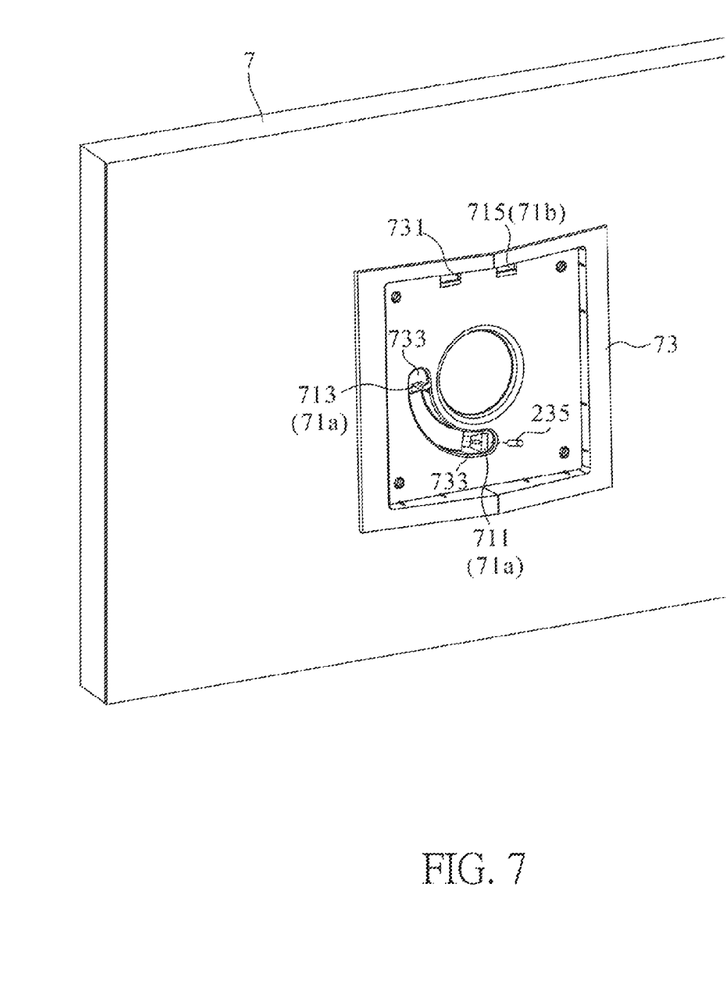
FIGS. 7 and 8 are perspective schematic views of a display device in 0°-orientation and 90°-orientation in accordance with one embodiment of the present invention.
Figure 8:
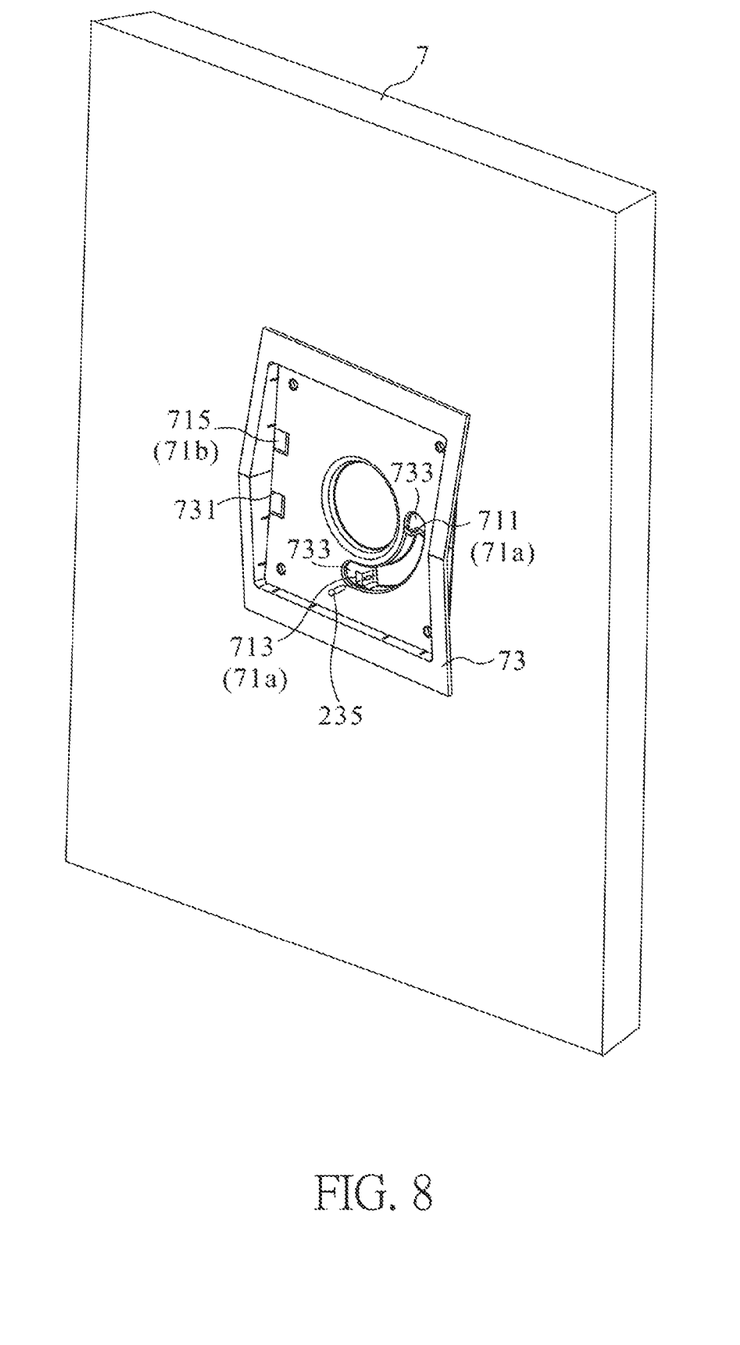

Attention is now directed to FIGS. 7 and 8 for detailed illustration of the configuration of the display device 7. In this illustration, the display device 7 is provided with two anode spring contacts 711, 713 and a cathode spring contact 715 at its rear side. The anode spring contacts 711, 713 can serve as anode contacts 71a of the display device 7 for electrical contact with the pin connector 235 in the position of the main plate 239 being in 0° and 90°-orientation. The cathode spring contact 715 can serve as a cathode contact 71b of the display device 7 for electrical contact with the protrusion 2393 of the main plate 239.

Detailed description is provided for the aspect of the display device 7 being equipped with a quick release structure 73 at its rear side as follows. The top edge of the quick release structure 73 can be firmly associated with the top edge of the main plate 239 by engaging the two protrusions 2393 of the main plate 239 in two recesses 731 at the top edge of the quick release structure 73. As such, one of the protrusions 2393 of the main plate 239 can abut and press on the cathode spring contact 715 disposed in one of the recesses 731. Likewise, please referring to FIG. 7, the pin connector 235 can be guided to abut and press on the anode spring contact 711 by engaging the bottom edge of the quick release structure 73 with the bottom edge of the main plate 239. As a result, the display device 7 can be electrically connected to the electrical function unit 3 through the electrical connection unit 4 to form an electrical loop by the electrical contact between the anode contact 71a of the display device 7 and the anode conductive portion 23a of the holding unit 23 and between the cathode contact 71b of the display device 7 and the cathode conductive portion 23b of the holding unit 23. Additionally, when the display device 7 is rotated from landscape orientation (as shown in FIG. 7) to portrait orientation (as shown in FIG. 8), the other anode spring contact 713 of the display device 7 would move along with the rotation to be aligned with and pressed by the pin connector 235. As a result, the display device in 0°- or 90°-orientation can be electrically connected to the circuit board 31 at the base 1 and drive the light emitting module 33 to emit light. On the contrary, since other orientations than landscape and portrait during rotation from FIG. 7 to FIG. 8 would cause the pin connector 235 to be disconnected with the anode spring contact 711 or 713 and result in open circuit, no light is emitted by the light emitting module 33.

The use of spring contacts as the anode and cathode contacts 71a, 71b has advantages of close contact between the pin connector 235 and the protrusion 2393, larger assembly tolerance, reduced mechanic interference and lower risk of being scratched or broken. In particular, as the anode spring contacts 711, 713 each has much larger contactable area than that of the pin connector 235, the pin connector 235 can be smoothly placed in contact with anode spring contact 711, 713 when mounting the display device 7 on the holding unit 23. Additionally, compared to the traditional plug-and-socket connection, the contact-type connection between the pin connector 235 and the anode spring contact 711, 713 can make the detaching operation of the display device 7 from the holding unit 23 much easier because no resistance need to be overcome for detaching. In other words, no additional plugging-in or pulling-away action is required for electrical connection or disconnection between the display device 7 on the supporting stand 1000 of the present invention. In this embodiment, the quick release structure 73 is provided with guide trenches 733 corresponding to the locations of the anode spring contacts 711, 713 to permit the pin connector 235 to be slidably disposed and thus to make the display device 7 more smoothly mounted on the holding unit 23 smoother without undesired interference.

Accordingly, the incorporation of the electrical connection unit in the interior of the supporting stand is advantageous because it can avoid exposed cables and give the supporting stand a cohesive (one-piece) feel. Further, by virtue of the specific cable routing, the electrical connection unit can be adapted to the motion of the supporting stand. As such, the motion of the supporting stand would not cause breaking of the electrical connection unit, thereby ensuring the product reliability and smooth operation.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A supporting stand for a display device, comprising:
   a base;
   a frame body, connected to the base and used for mounting the display device thereon and rotatable with respect to the base, wherein (i) the frame body has a receiving trough formed within an interior thereof to define a shortest pathway between the base and a predetermined location for mounting the display device, (ii) the frame body includes an upright and a holding unit, (iii) the upright is connected to the base, and (iv) the holding unit is connected to the upright and capable of sliding upward and downward in a channel of the upright;
   an electrical function unit, disposed within the base; and
   an electrical connection unit, extending through the receiving trough to provide an electrical connection between the display device and the electrical function unit, wherein (i) the electrical connection unit includes a main cable, (ii) the main cable is electrically connected to the electrical function unit and has a reserve section longitudinally extending to the base and a free section corresponding to the channel of the upright, (iii)

the reserve section has a cable length larger than a minimal pathway distance corresponding to the reserve section, (iv) the reserve section of the main cable is in a relaxed state when the frame body is not pivoted to a pivot angle and twists adapted to pivot motion of the frame body, and (v) the free section is forced into bending to be adapted to sliding motion of the holding unit.

2. The supporting stand of claim 1, wherein the difference between the cable length of the reserved section and the corresponding minimal pathway distance is determined by rotatable angle of the frame body.

3. The supporting stand of claim 1, further comprising a first organizer and a second organizer, wherein the reserve section of the main cable longitudinally extends through the first organizer and the second organizer in sequence in a direction toward the base, and the main cable is bent by the second organizer at the base and has an lateral extension section that laterally extends to and is electrically connected to the electrical function unit.

4. The supporting stand of claim 3, wherein the first organizer rotates synchronously with pivot motion of the frame body, whereas the second organizer keeps stationary.

5. The supporting stand of claim 4, wherein (i) the base comprises a fixing baseplate and a rotary plate, (ii) the rotary plate is disposed on the fixing baseplate and connected to the frame body and rotatable with respect to fixing baseplate, (iii) the first organizer is disposed at the rotary plate and rotatable with the rotary plate, and (iv) the second organizer is disposed at the fixing baseplate.

6. The supporting stand of claim 5, wherein the first organizer and the second organizer are disc-shaped and each of them has a through opening in an elongated shape at a center thereof to permit passage of the main cable.

7. The supporting stand of claim 1, wherein the free section has one end fastened to the holding unit and movable with the holding unit and an opposite end fastened to the upright.

8. The supporting stand of claim 7, wherein the holding unit is provided with plural retaining rings, and the main cable extends through the retaining rings and are fastened to the holding unit by an adhesive.

9. The supporting stand of claim 1, wherein (i) the electrical connection unit further includes a first cable and a second cable, (ii) the first cable provides an electrical connection between an anode contact of the display device and the main cable, and (iii) the second cable provides an electrical connection between a cathode contact of the display device and the main cable.

10. The supporting stand of claim 9, wherein the shortest pathway extends from a junction between the main cable and the first cable and between the main cable and the second cable to the base.

* * * * *